United States Patent
Trappeniers et al.

(10) Patent No.: US 7,386,738 B2
(45) Date of Patent: Jun. 10, 2008

(54) METHOD FOR WAKING UP A SLEEPING DEVICE, A RELATED NETWORK ELEMENT AND A RELATED WAKING DEVICE

(75) Inventors: Lieven Leopold Albertine Trappeniers, Noorderwijk (BE); Arjen Hendrikse, Etterbeek (BE); Marc Bruno Frieda Godon, Londerzeel (BE); Koen Handekyn, Ghent (BE)

(73) Assignee: Alcatel, Paris (FR)

( * ) Notice: Subject to any disclaimer, the term of this patent is extended or adjusted under 35 U.S.C. 154(b) by 429 days.

(21) Appl. No.: 11/010,410

(22) Filed: Dec. 14, 2004

(65) Prior Publication Data

US 2005/0131555 A1 Jun. 16, 2005

(30) Foreign Application Priority Data

Dec. 15, 2003 (EP) ................................... 03293170

(51) Int. Cl.
*G06F 1/00* (2006.01)
*G06F 1/26* (2006.01)

(52) U.S. Cl. ...................................... 713/300; 713/320
(58) Field of Classification Search ................ 713/300
See application file for complete search history.

(56) References Cited

U.S. PATENT DOCUMENTS 6,289,464 B1 * 9/2001 Wecker et al. .............. 713/300
6,353,765 B1   3/2002 Shinotsuka
7,031,380 B1 * 4/2006 Cheng et al. ................ 375/222
2002/0173325 A1 * 11/2002 Rosen et al. ................ 455/518
2004/0255008 A1 * 12/2004 Olsen et al. ................ 709/220

FOREIGN PATENT DOCUMENTS

EP   0 835 008 A2   4/1998
EP   0 977 112 A2   2/2000

* cited by examiner

*Primary Examiner*—Rehana Perveen
*Assistant Examiner*—Stefan Stoynov
(74) *Attorney, Agent, or Firm*—Sughrue Mion, PLLC

(57) ABSTRACT

The present invention relates to a method for waking up a sleeping device. The sleeping device being coupled to a waking device over a communications network. The sleeping device is adapted to provide a service in an awake state, to the waking device at request for service of the waking device. This method, first, comprises the step of sending the request for service by the waking device in direction of the sleeping device. The communications network additionally comprises a Network Element which is always on, and being coupled to the communications network. The method further comprises the steps of the Network Element intercepting the request for service destined to the sleeping device and the step of the Network Element at intercepting of the request for service, generating a request to wake up the sleeping device and determine a substitute service to the waking device until the sleeping device is awake. The Network Element then sends the request to wake up to the sleeping device and provisions a substitute service, to the waking device until the sleeping device is awake.

18 Claims, 2 Drawing Sheets

METHOD FOR WAKING UP A SLEEPING DEVICE, A RELATED NETWORK ELEMENT AND A RELATED WAKING DEVICE

BACKGROUND OF THE INVENTION

1. Field of the Invention

The present invention relates to a method for waking up a sleeping device, as described in the preamble of claim 1 and the related waking device as described in the preamble of claim 5.

2. Description of Related Art

Such a method and related devices are already known in the art, e.g. from the European Patent Application with reference EP0977112 A2 with title "METHOD AND APPARATUS FOR CONTROLLING POWER OF A COMPUTER SYSTEM ON A LAN (LOCAL AREA NETWORK)" from the inventor Ryu, Chang-Hyun published at Feb. 2, 2000.

Therein, a method for controlling power of a computer system coupled to a communications network, called Local Area Network, using a wake on local area network LAN signal is described. Such a computer system contains a "wake-on-LAN" feature allowing computers that are in a sleeping state, called powered-off state, to wake up, called powered up, at receiving of a wake on LAN signal from a service requesting device on a network interface of the computer system.

However, such a device, when in a sleeping state or going from a sleeping state to a wake up state called the wake up period, is not available to play a role in any networked service because of time-outs, which means that at an incoming request, i.e. an HTTP GET, arriving at such a Personal Computer, even if the PC wakes up, due to time-outs on the underlying TCP and/or TCP layer, the request for service will not be successfully responded to.

Furthermore, such a device in a sleeping state or during the wakeup period is not available because of the volatility and/or unreachability of the IP address because if an application or service (either local or remote) needs to access information that is available on a standby residential network device, there is no means to know the IP address to use or (if the IP address is known), it might be temporarily unreachable. During the period that the device is sleeping or starting up, the device might not have an IP address (released or lease expires) or even when it would have an IP address, the lower layers of the protocol stack will not be able to relate this IP address to a network interface card due to expiring entries in (for example Ethernet) lookup tables.

SUMMARY OF THE INVENTION

An object of the present invention is to provide a method for waking up a sleeping device of the above known type and a device for waking up a sleeping device but wherein the wake up period wherein the sleeping device is going from the sleeping state towards the awake state is concealed for a service requesting device.

According to the present invention, this object is achieved by the method for waking up a sleeping device as described in claim 1, the Network Element as described in claim 4, and the related waking device as described in claim 5.

Indeed, by engaging a Network Element which is always on, in the communications network, the Network Element is able to receive or intercept a request for service destined to the sleeping device and at intercepting of such a request for service by the Network Element, the Network Element, generates a request to wake up the sleeping device and determines a substitute service to provision to the waking device until the sleeping device is awake. In this way the waking device is provided with a substitute service instead of the requested service during the wake-up period in order to comfortably bridge this wake up period and wherein the wake up period is concealed for a service requesting device.

An additional characteristic feature of the present invention is described in claim 2.

The substitute service provisioned to the waking device is the same service as the requested service.

An additional characteristic feature of the present invention is described in claim 3.

The substitute service provisioned to the waking device is the provisioning of a service to bridge a period of time required for said sleeping device to wake up.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

Figure 1:
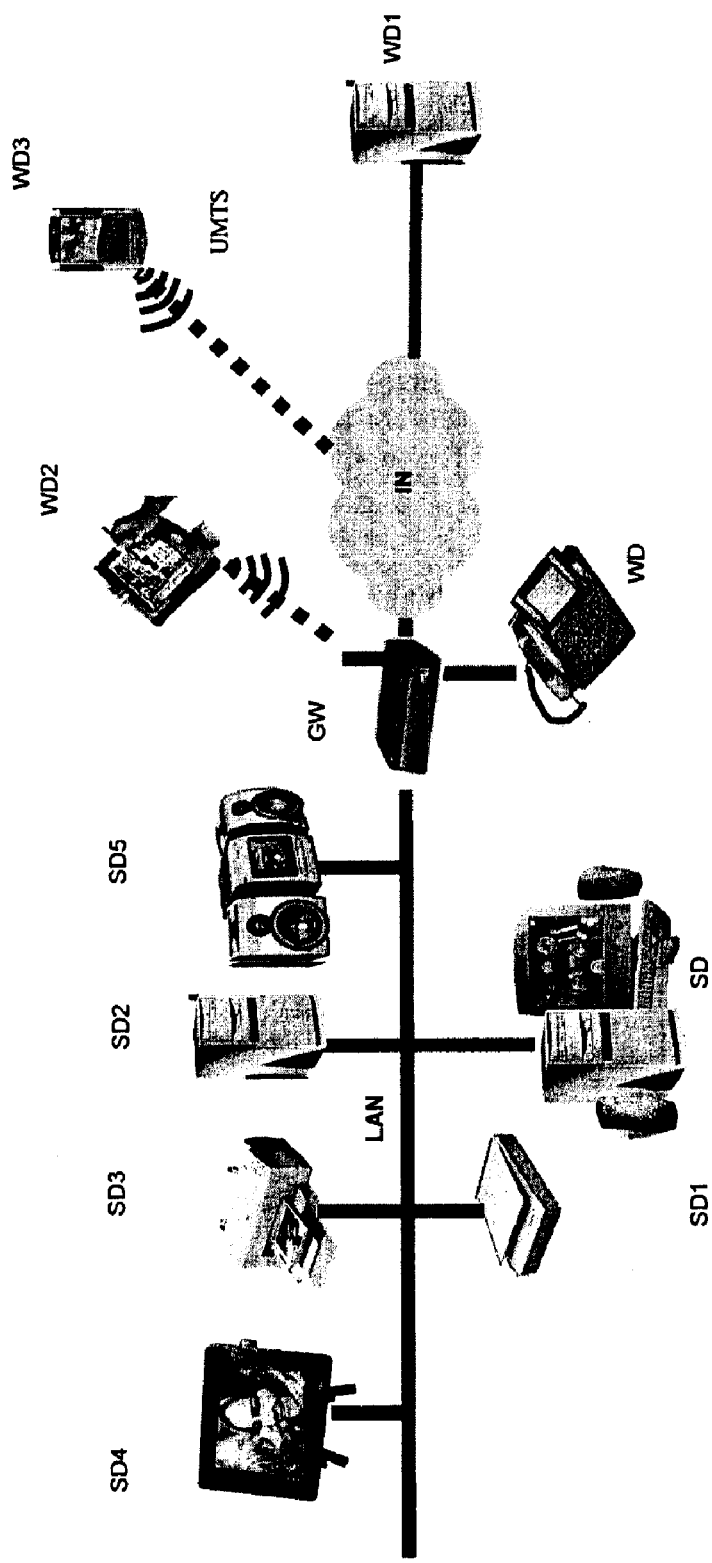
FIG. 1 represents a communications network wherein the present invention is executed.
Figure 2:
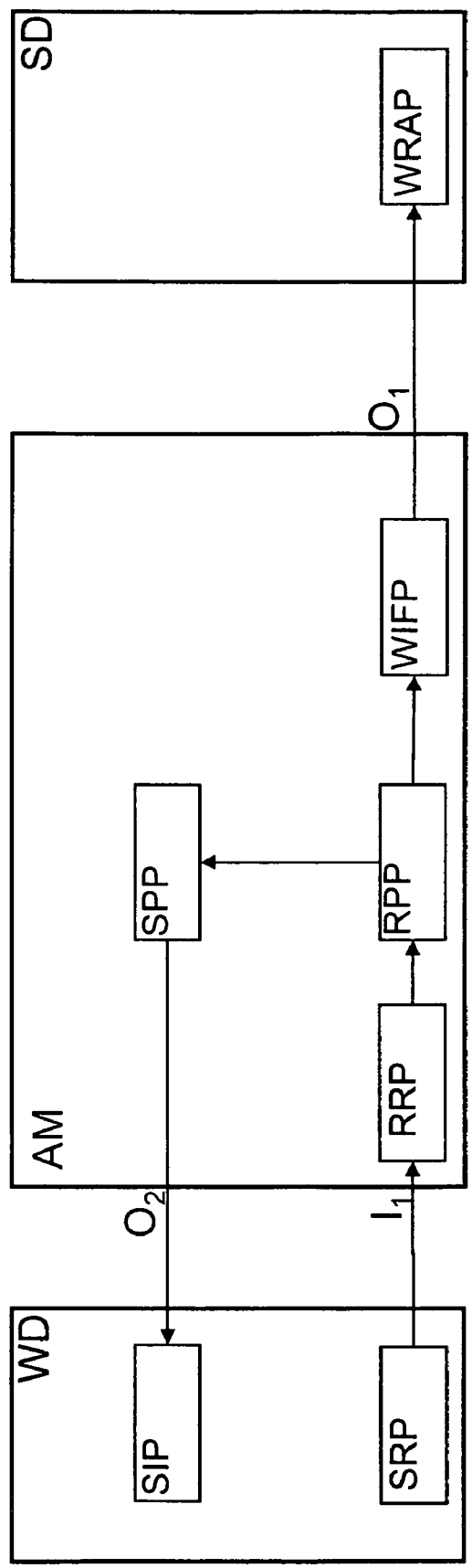
FIG. 2 represents the functional representation of a sleeping device SD, a waking device WD and a Network Element AM as presented in FIG. 1.

In the following paragraphs, referring to the drawings, an implementation of the method for waking up a sleeping device, a sleeping device SD, a Network Element AM and a waking device WD according to the present invention will be described. In the first paragraph of this description the main elements of the communications system as presented in FIG. 1 are described. In the second paragraph, all connections between the before mentioned elements and described means are defined. Subsequently all relevant functional means of the sleeping device SD, the Network Element AM and the waking device WD as presented in FIG. 2 are described followed by a description of all interconnections. In the succeeding paragraph the actual execution of the method for waking up a sleeping device is described.

DETAILED DESCRIPTION OF EXEMPLARY EMBODIMENTS

The essential elements of the communications network of the embodiment according to the present invention are sleeping devices SD . . . SD5 which are in a power down state because of an energy saving strategy while not in use, waking devices WD . . . WD2 which are able to request a service from a sleeping device and a Network Element AM having a certain functionality in the communications network and which is always powered on.

In this embodiment, it chosen to describe a number of sleeping devices, present in the home environment of a user, at first a personal computer SD, and besides a scanner SD1, a personal computer SD2, a printer SD3, a Television set SD4 and a sound system SD5. The Network Element AM here is chosen to be an always powered ADSL modem. Alternatively this may be a Personal Computer, which is always on and forms part of the communications network or any other device in the communications which is always on. The waking device is a telephone set WD, a DVD movie provider WD1 or a personal assistant WD2 that is able to request a service of a sleeping device or a set of sleeping devices, where for instance a number of sleeping devices co-operate to provide the requested service. Optionally there may be a UMTS terminal WD3 for requesting services of sleeping device or a set of sleeping devices.

Each of the sleeping devices present in the users home environment is coupled to a Local Area Network, further referred to as LAN, which is installed at home the user's house. Alternatively, each of the sleeping devices together with the always on Network Element AM may be coupled over a wireless, fiber. Then the ADSL modem AM couples the LAN to the internet. The waking devices, the telephone set WD and the personal assistant WD1 are coupled to the ADSL modem over respectively a copper wire and an air link.

The waking devices alternatively may be coupled directly to the LAN.

The UMTS terminal WD2 is coupled over an UMTS link to the internet network IN.

An essential element of the waking device WD is the service requesting part SRP that is able to request the sleeping device for a service.

The Network Element AM which is always on, comprises a request reception part RRP that is able to receive a request for service destined to the sleeping device SD and forwarded by the waking device WD, a request processing part RPP that is able to at receiving the request for service, generate a request to wake up to the sleeping device SD and determine a substitute service to be provided to the waking device WD until the sleeping device is awake. Further there is a substitute service provisioning part that is adapted to provision the substitute service to the waking device WD and a wake up instruction forwarding part WIFP for forwarding the request to wake up the sleeping device generated by the request processing part RPP towards the sleeping device.

The sleeping device has a wake up receiving and activating part WRAP for receiving the wake up request and waking up the sleeping device.

The waking device further comprises a substitute service interpreting part SIP that is adapted to interpret the substitute service provisioned to said waking device by the network element. The service requesting part SRP, of the waking device, has an output-terminal that is at the same time output-terminal of the waking device WD.

The substitute service interpreting part SIP has an input-terminal that is at the same time an input-terminal of the waking device WD.

Further, the request reception part RRP has an input-terminal that is at the same time an input-terminal $I_1$ of the Network Element AM and is further coupled with an output to an input of the a request processing part RPP. The request processing part RPP further is coupled with an output to an input of the wake up instruction forwarding part WIFP. The wake up instruction forwarding part WIFP additionally has an output-terminal that is at the same time output-terminal $O_1$ of the Network Element AM. Moreover the request processing part RPP is coupled with an output to an input of the substitute service provisioning part SPP, that in its turn has an output-terminal that is at the same time output-terminal $O_2$ of the Network Element AM.

The wake up reception and activating part WRAP of the sleeping device has an input-terminal that is at the same time an input-terminal of the sleeping device SD.

It is to be noted that any of the waking devices WD1 ... WD3 has the same structure as waking device WD and any of the sleeping devices SD1 ... SD4 has the same structure as the sleeping device SD.

In order to explain the operation of the present invention it is assumed that the waking device here is the DVD movie provider WD1 where the home user has previously selected a DVD movie from the movie providers collection and subsequently has ordered a DVD movie to be delivered at the users Television set SD4 which is assumed to be a currently sleeping device.

The DVD movie provider WD1 is connected to the internet network IN and is able to forward a previously selected and ordered movie via the internet network IN, the ADSL modem AM and the LAN to the television set SD4.

The DVD movie provider WD1 at the time of ordering the DVD movie from the movie provider sends the request for service, towards the television set SD4 to wake up and get ready for displaying the ordered movie. The wake up reception part RRP of the ADSL modem AM then intercepts the request for service forwarded by the ADSL modem AM. The request for service, alternatively, may be directly destined to the ADSL modem AM in which case the ADSL modem AM directly receives the request.

Then the request processing part RPP at intercepting or receiving of the request for service destined for the sleeping device SD4, here in this case the television set SD4, generates a wake up instruction for the television set SD4 which is forwarded by the wake up instruction forwarding part WIFP of the network element AM and received by de wake up receiving and activating part WRAP of the television set SD4.

The wake up receiving and activating part WRAP initialised the start-up of the television set SD4.

In the mean time, the movie is being forwarded from the DVD movie provider WD1 to the ADSL modem AM although the television set is not yet ready to receive the movie and display it on the screen.

Therefore, the request processing part RPP determines the substitute service to provision to the waking device until the television set SD4 is awake is the buffering of the video data till the television set is ready to show the movie. Otherwise the beginning part of the movie would have been lost because the television set was not yet ready to display the ordered movie.

Another possible substitute service might be sending the movie provider a request to delay the sending of the video data.

The substitute service provisioning part SPP then provisions the substitute service by buffering of the video data till the television set is ready to show the movie or for instance by sending the movie provider a request to delay the sending of the video data.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for waking up a sleeping device, said sleeping device being coupled to a waking device over a communications network, said sleeping device being adapted to provide a service in an awake state, to said waking device at request for service of said waking device, said method comprising:

sending said request for service by said waking device in direction of said sleeping device, where said communications network comprises a network element which is always on, coupled to said communications network;

said network element intercepting said request for service destined to said sleeping device;

said network element, at intercepting of said request for service, generating a request to wake up said sleeping device and determining a substitute service to said waking device until said sleeping device is awake;

said network element sending said request to wake up to said sleeping device; and said network element provisioning a substitute service to said waking device until said sleeping device is awake, the substitute service conceals from the waking device waking up of the sleeping device.

2. The method for waking up a sleeping device according to claim 1, wherein said provisioning a substitute service to said waking device is provisioning same service as the requested service.

3. The method for waking up a sleeping device according to claim 1, wherein said provisioning a substitute service to said waking device is provisioning a service to bridge a period of time required for said sleeping device to wake up.

4. The method according to claim 1, wherein said provisioning a substitute service to said waking device is provisioning different service to said waking device from the requested service.

5. The method according to claim 1, wherein the network element does not have a sleeping mode.

6. The method according to claim 1, wherein the network element is an asymmetrical digital subscriber line modem.

7. The method according to claim 6, wherein the network element is connected to the sleeping device via a local access network and to the waking device via a universal mobile telecommunications system (UMTS) network.

8. The method according to claim 7, wherein the sleeping device comprises at least one of a television, a digital camera, a video camera, a media player, and a storage server.

9. The method according to claim 7, wherein the sleeping device is a consumer electronic device of a home network.

10. The method according to claim 1, wherein the sleeping device is a device of a home network.

11. The method according to claim 1, wherein the network element is connected to the sleeping device via a local access network.

12. A network element for waking up a sleeping device, said sleeping device being coupled to a waking device over a communications network, said sleeping device being adapted to provide a service, in an awake state, to said waking device at request for service of said waking device, said network element comprising:

a request reception part which receives or intercepts said request for service forwarded by said waking device;

a request processing part, coupled with an input to an output of said request reception part and which receives or intercepts said request for service destined to said sleeping device, generates a request to wake up said sleeping device and determine a substitute service to said waking device until said sleeping device is awake;

a substitute service provisioning part, coupled with an input to an output of said request processing part and which provisions said substitute service to said waking device; and a wake up instruction forwarding part, coupled with an input to an output of said request processing part and which forwards said request to wake up said sleeping device generated by said request processing part towards said sleeping device, wherein the network element is always on and wherein said sleeping device is a device of a home network, and wherein the substitute service conceals from the waking device waking up of the sleeping device.

13. The network element according to claim 12, wherein the network element is connected to the sleeping device via a local access network and to the waking device via a universal mobile telecommunications system (UMTS) network.

14. A waking device, for waking up a sleeping device, said sleeping device being coupled to said waking device over a communications network, said sleeping device being adapted to provide a service in a awake state, to said waking device at request for service of said waking device, said waking device comprising:

a service request forwarding part which forwards a request for service destined to said sleeping device to a network element of said communications network which is always on; and a substitute service interpreting part receiving a substitute service from a substitute service provisioning part of the network element, which provisions said substitute service, the substitute service conceals from the waking device waking up of the sleeping device.

15. The waking device according to claim 14 further comprising a substitute service interpreting part which interprets the substitute service provisioned to said waking device by said network element.

16. The waking device according to claim 14, wherein the sleeping device coupled to the waking device is a device of a home network.

17. The waking device according to claim 14, wherein the network element is connected to the sleeping device via a local access network and to the waking device via a universal mobile telecommunications system (UMTS) network.

18. A method for waking up a sleeping device, said sleeping device being coupled to a waking device over a communications network, said sleeping device being adapted to provide a service in an awake state, to said waking device at request for service of said waking device, said method comprising:

sending said request for service by said waking device in direction of said sleeping device, where said communications network comprises a network element which is always on, coupled to said communications network;

said network element intercepting said request for service destined to said sleeping device;

said network element, at intercepting of said request for service, generating a request to wake up said sleeping device and determining a substitute service to said waking device until said sleeping device is awake;

said network element sending said request to wake up to said sleeping device; and said network element provisioning a substitute service to said waking device until said sleeping device is awake, wherein the network element is connected to the sleeping device via a local access network and to the waking device via a universal mobile telecommunications system (UMTS) network.

* * * * *